(12) United States Patent
Elliott et al.

(10) Patent No.: US 9,162,751 B2
(45) Date of Patent: *Oct. 20, 2015

(54) APPARATUS FOR USE ON AN AIRCRAFT

(71) Applicant: AIRBUS OPERATIONS LIMITED, Filton, Bristol (GB)

(72) Inventors: Nicholas Elliott, Winscombe (GB); Arnaud Didey, Portsmouth (GB); John W. Griffin, Winscombe (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 0 days.

This patent is subject to a terminal disclaimer.

(21) Appl. No.: 14/209,624

(22) Filed: Mar. 13, 2014

(65) Prior Publication Data
US 2014/0263829 A1  Sep. 18, 2014

Related U.S. Application Data

(63) Continuation of application No. 12/859,324, filed on Aug. 19, 2010, now Pat. No. 8,702,035.

(30) Foreign Application Priority Data

Aug. 20, 2009  (GB) .................................. 0914576.4

(51) Int. Cl.
*B64C 25/20* (2006.01)
*B64C 13/28* (2006.01)
(Continued)

(52) U.S. Cl.
CPC ................. *B64C 13/34* (2013.01); *B64C 25/20* (2013.01); *B64C 25/30* (2013.01); *F16H 25/20* (2013.01); *B64C 13/42* (2013.01); *F16H 2025/2068* (2013.01); *Y10T 74/186* (2015.01); *Y10T 74/18592* (2015.01)

(58) Field of Classification Search
CPC .......... B64C 25/10; B64C 13/42; B64C 25/30
USPC ............. 244/102 R, 211–217, 87, 90 R, 99.2, 244/99.3, 99.4, 99.9, 100 R, 102 A; 192/84.6, 94; 74/89.25, 89.26, 89.29
See application file for complete search history.

(56) References Cited

U.S. PATENT DOCUMENTS 3,595,094 A   7/1971  Lemor
4,179,944 A   12/1979 Conner
(Continued)

FOREIGN PATENT DOCUMENTS

WO    2007/099333 A1   9/2007
WO    2008057106 A1    5/2008

OTHER PUBLICATIONS

ISR for GB0914576.4 dated Dec. 14, 2009.
(Continued)

*Primary Examiner* — Rob Swiatek
(74) *Attorney, Agent, or Firm* — Hauptman Ham, LLP

(57) ABSTRACT

An actuator is arranged to move an aircraft component such as a landing gear leg, flap or aileron between a first position and a second position, net load from external forces acting on the aircraft component tending to drive it towards the first position. The actuator comprises a threaded screw and a threaded nut. A main prime mover is configured to apply torque to the screw or nut acting in opposition to the net load under normal operating conditions. An emergency prime mover is configured to apply torque to the screw or nut acting in the same sense as the net load under emergency operating conditions in which the interface between the nut and the screw has become partially jammed to the extent that the component cannot be moved from the second position to the first position by operation of the net load alone.

15 Claims, 4 Drawing Sheets

(51) Int. Cl.
  *B64C 9/00*    (2006.01)
  *B64C 13/34*   (2006.01)
  *B64C 25/30*   (2006.01)
  *F16H 25/20*   (2006.01)
  *B64C 13/42*   (2006.01)

(56) References Cited

U.S. PATENT DOCUMENTS

| | | |
|---|---|---|
| 4,703,666 A | 11/1987 | Fickler |
| 6,672,540 B1 | 1/2004 | Shaheen et al. |
| 7,464,896 B2 | 12/2008 | Carl et al. |
| 7,560,888 B2 | 7/2009 | Quitmeyer et al. |
| 2006/0113933 A1 | 6/2006 | Blanding et al. |
| 2008/0185476 A1 | 8/2008 | Suisse et al. |
| 2010/0012779 A1 | 1/2010 | Collins |
| 2010/0038478 A1 | 2/2010 | Knight |
| 2010/0096498 A1 | 4/2010 | McKay |
| 2010/0213311 A1 | 8/2010 | Flatt et al. |
| 2011/0042511 A1 | 2/2011 | Elliott et al. |

OTHER PUBLICATIONS

Jouni Ikaheimo, Permanent magnet motors eliminate gearboxes, ABB Review, Nov. 13, 2003, pp. 22-25.

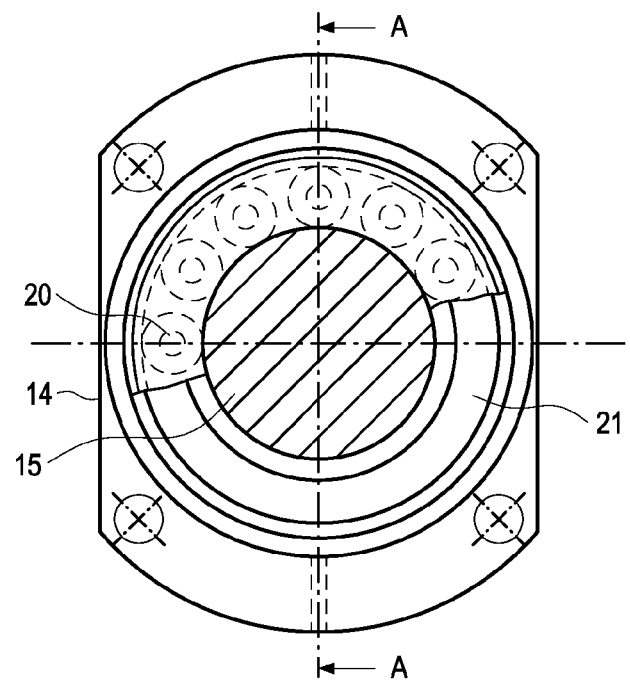
Figure. 3
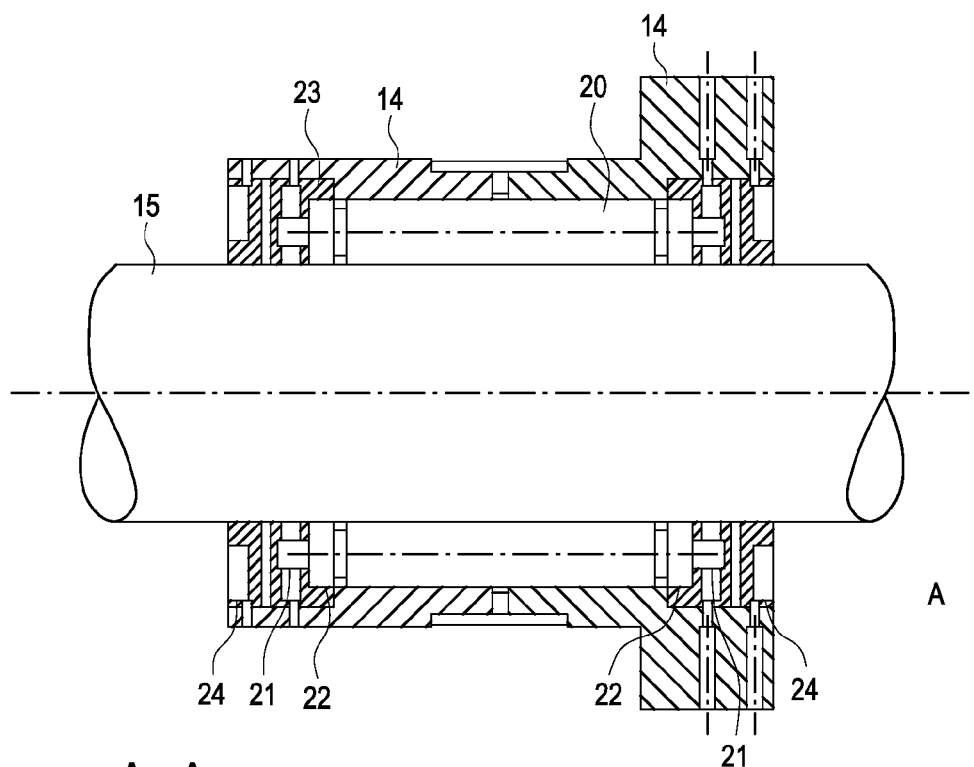
A - A  Figure. 4

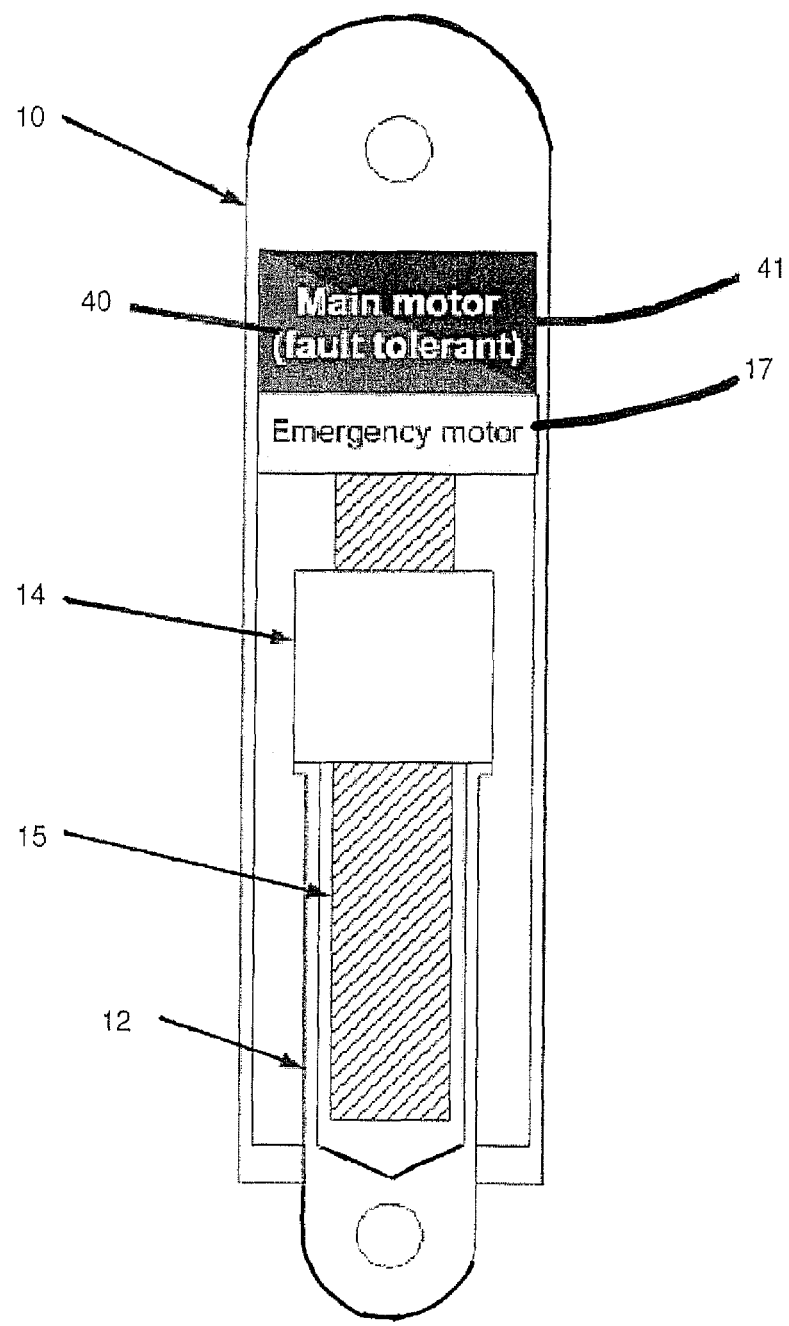

APPARATUS FOR USE ON AN AIRCRAFT

RELATED APPLICATIONS

The present application is a Continuation of U.S. application Ser. No. 12/859,324 filed Aug. 19, 2010, which claims priority to British Application Number GB0914576.4 filed Aug. 20, 2009, the disclosures of which are hereby incorporated by reference herein in their entirety.

FIELD OF THE INVENTION

The present invention relates to apparatus for use on an aircraft, and an associated method. The apparatus comprises: an aircraft component; and an actuator arranged to move the aircraft component between a first position and a second position, net external load acting on the aircraft component tending to drive it towards the first position. The actuator comprises a threaded screw and a threaded nut.

BACKGROUND OF THE INVENTION

Aircraft have various safety-critical components which must be driven by an actuator between a first position and a second position. Examples of such components are a landing gear leg which is driven by the actuator between a raised and a lowered position relative to the fuselage; or flight control devices such as ailerons, spoilers or rudders.

Most safety-critical components on an aircraft, including those mentioned above, are designed so that net external load from aerodynamic forces and mass forces acting on the aircraft component tends to drive it towards one of the positions (for instance the extended position in the case of a landing gear component, or the neutral position in the case of a flight control device).

The actuator for such safety-critical components should of course be of high integrity and should have a very low risk of failure. For example, it is important for there to be provided a secondary, or emergency, extension system for extending the landing gear leg from the up-locked position (before landing) and for opening the landing-gear bay doors, in the event of a loss of the normal extension system. Such an emergency extension system should be required not only to extend the landing gear from its up-locked position, but also from any intermediate position in the event of a failure of the gear to retract fully for example.

There is a desire to reduce the reliance on hydraulic systems in large commercial aircraft and thus there is currently a desire to use electric actuators, where previously hydro-mechanical actuators were used.

One type of electric actuator which is commonly used has a threaded screw and a threaded nut which is driven by an electric motor to impart relative linear motion between the screw and the nut. However conventional perception is that there is a high risk of failure in the interface between the screw and the nut, so where such an actuator is used to drive a safety-critical component then the system must be designed to be failure tolerant. For instance in WO 2007/099333 the actuator is a series redundant actuator consisting of two back-to-back roller screws each driven by an independent electric motor. WO 2008/057106 describes an actuator with a threaded output screw which is driven by three roller nuts, each nut being driven by a different motor module. The problem with such conventional actuators is that although they have a high degree of failure tolerance, they are also large and bulky.

SUMMARY OF THE INVENTION

A first aspect of the invention provides apparatus for use on an aircraft, the apparatus comprising: a component; an actuator arranged to move the component between a first position and a second position, net load from external forces acting on the component tending to drive it towards the first position, wherein the actuator comprises a threaded screw; a threaded nut; a main prime mover arranged to rotate the screw or the nut in order to impart relative linear motion between the screw and the nut; an emergency prime mover arranged to rotate the screw or the nut in order to impart relative linear motion between the screw and the nut, a normal control system configured to energise the main prime mover under normal operating conditions so that it applies torque to the screw or nut acting in opposition to the net load; and an emergency control system configured to energise the emergency prime mover under emergency operating conditions so that it applies torque to the screw or nut acting in the same sense as the net load thereby driving the component to the first position.

A second aspect of the invention provides a method of operating the apparatus of the first aspect of the invention on an aircraft, the method comprising:
  applying a torque to the nut or screw with the main prime mover when the component moves from the second position to the first position under normal operating conditions, the torque acting in opposition to the net load;
  applying a torque to the nut or screw with the main prime mover when the component moves from the first position to the second position under normal operating conditions, the torque acting in opposition to the net load; and
  applying a torque to the nut or screw with the emergency prime mover to drive the component from the second position to the first position under emergency operating conditions in which the interface between the nut and the screw has become partially jammed to the extent that the component cannot be moved to the first position by operation of the net load alone, the torque acting in the same sense as the net load.

Preferably a set of rolling elements, such as balls or elongate rollers, are provided between the nut and the screw.

The aircraft component may be for example a landing gear component such as a landing gear leg or a landing gear bay door; or a flight control device such as a spoiler, aileron, rudder or similar. In the case of a landing gear component, the net load from external forces acting on the landing gear leg tends to drive it towards an extended (lowered) position. In the case of a flight control device, the net load from external forces tends to drive it towards a neutral position in which aerodynamic forces are at a minimum (for example a central position in the case of an aileron or a lowered position in the case of a spoiler).

Various other preferred features are set out in the dependent claims.

BRIEF DESCRIPTION OF THE DRAWINGS

Embodiments of the invention will now be described with reference to the accompanying drawings, in which:
FIG. 3 is a transverse sectional view of the actuator;
FIG. 4 is a longitudinal sectional view taken along a line A-A in FIG. 3;
and
  FIG. 5 is a schematic view of an alternative actuator.

DETAILED DESCRIPTION OF EMBODIMENT(S)

Figure 1:
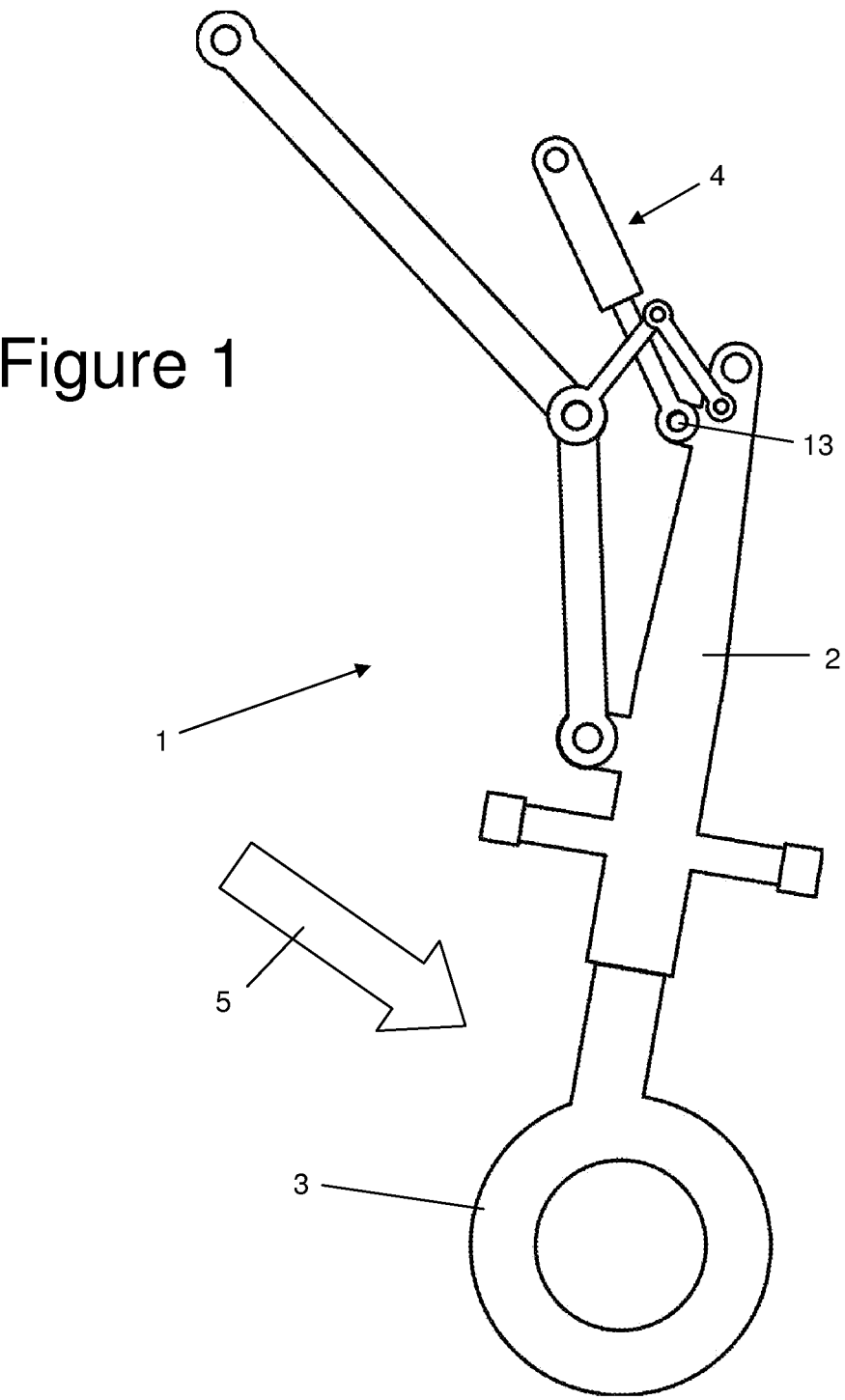
FIG. 1 shows a landing gear assembly.

FIG. 1 shows a nose landing gear assembly 1 comprising a landing gear leg 2 carrying a wheel 3. A roller screw actuator 4 is attached to the landing gear leg 2 and can drive it between an extended position and a retracted position. The extended position is deemed as a "safe" position for the actuator to jam since the aircraft will then be able to land safely. However the retracted position (and any intermediate partially retracted position) are deemed "unsafe" since in this situation the aircraft will be unable to land safely, at least on that particular landing gear leg.

Note that the landing gear leg 2 is designed so that net load 5 arising from external aerodynamic and mass (gravitational) forces acting on the landing gear leg tends to drive it towards the safe extended position. During retraction under normal operating conditions the actuator 4 accelerates the landing gear leg, acting against this net load 5. During extension under normal operating conditions the actuator 4 decelerates the landing gear leg, also acting against the net load 5.

Figure 2:
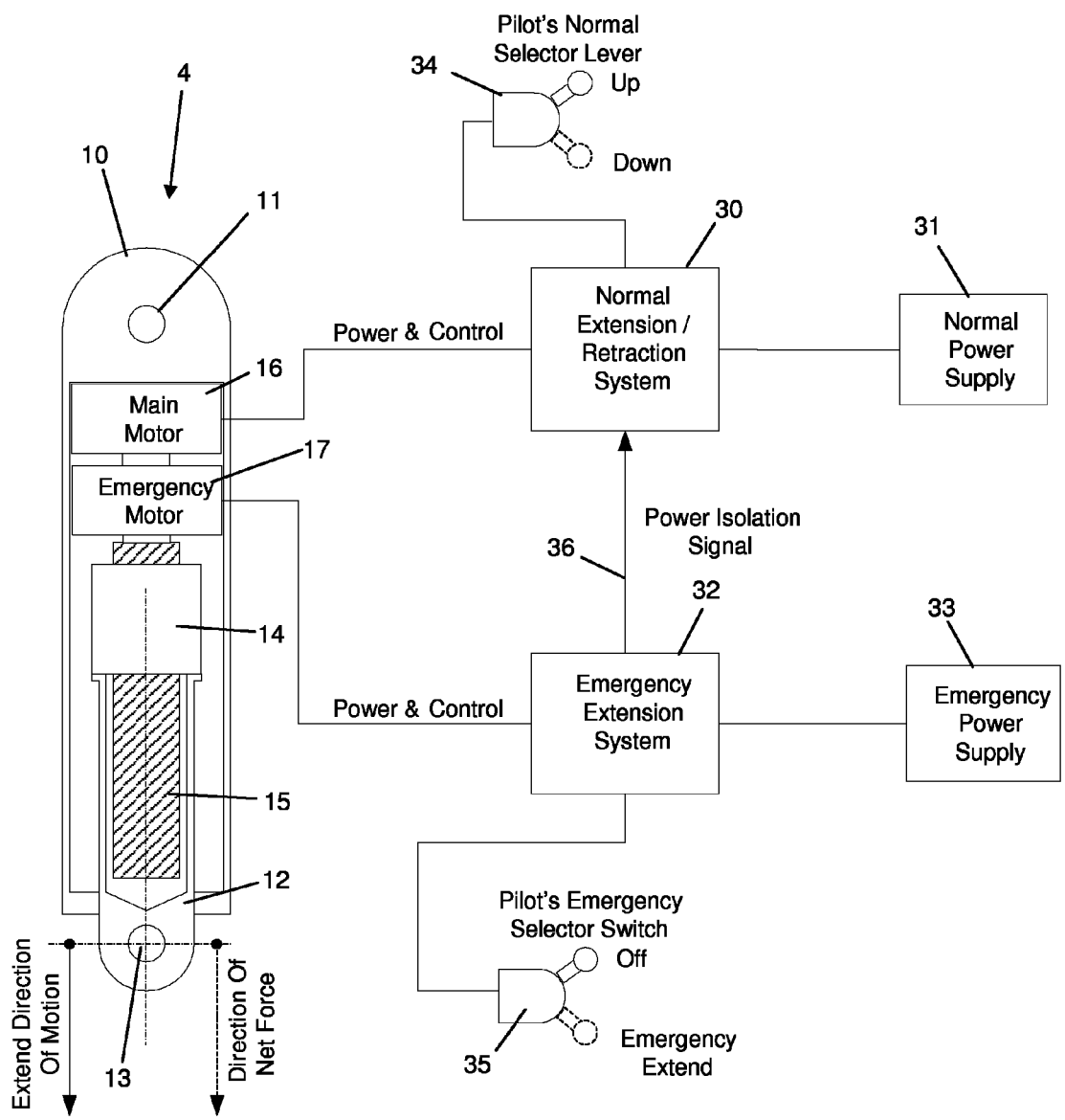
FIG. 2 is a schematic view of the actuator and associated control system.

FIG. 2 shows the actuator 4 in detail, along with its associated control system. The actuator has a body 10 pivotally attached to a reaction member (e.g. the body of the aircraft) at 11 and an output rod 12 pivotally attached to the landing gear leg at 13. The output rod 12 carries an internally threaded nut 14 at one end. An externally threaded screw 15 passes through the nut 14. The nut 14 and output rod 12 are prevented from rotating by one or both of the following means:
- a key (not shown) on the nut 14 or rod 12 which engages with a keyway (not shown) in the actuator body 10; and/or
- a clevis joint (not shown) at the end 13 of the output rod 12 where it is pivotally attached to the landing gear leg.

FIGS. 3 and 4 show the interaction between the nut 14 and the screw 15 in detail. A set of rollers 20 is arranged between the screw 15 and the nut 14. The rollers have a thread with the same thread angle as that of the nut so there is no axial movement between the nut 14 and the rollers 20. At each end of each roller there is a cylindrical pivot received in a hole in an end ring 21, and an externally toothed gear wheel 22. The teeth of the gear wheel 22 engage in the internal teeth of a gear wheel 23 fixed in the nut. The end rings 21 are mounted in a floating fashion in the nut body and are axially secured with circlips 24. By way of example the actuator 4 may comprise a satellite roller screw RV or BRV, available from Rollvis SA, of Geneva Switzerland.

Returning to FIG. 2, a main electric motor 16 is coupled to the screw 15. The main motor is a so-called direct-drive motor, that is it is coupled directly to the screw without any reduction mechanism such as gears (although optionally a clutch mechanism may be provided if desired). When the main motor 16 is energised, it applies torque to the screw 15 which causes the screw to rotate, and the interaction between the screw 15 and the nut 14 causes the output rod 12 to extend or retract in a linear fashion into or out of the body 10.

An emergency motor 17 is also directly coupled to the screw 15 (optionally via a clutch) without any reduction mechanism such as gears. As with the main motor 16, when the emergency motor 17 is energised, it applies torque to the screw 15 which causes the screw to rotate, and the interaction between the screw 15 and the nut 14 causes the output rod 12 to extend or retract in a linear fashion into or out of the body 10.

The control system for controlling the actuator 4 comprises a normal extension/retraction system 30 powered by a normal power supply 31, and an emergency extension system 32 powered by an emergency power supply 33.

The main motor 16 is sized for the maximum operating loads and required retraction time. The normal power supply 31 is a high voltage power supply e.g. +/−270 VDC.

A normal selector lever 34 can be operated by a pilot to either extend or retract the landing gear. Under normal operating conditions, when the pilot operates the selector lever 34 to extend or retract the landing gear then only the main motor 16 is energised by the normal system 30 and the emergency motor 17 is driven by the screw in a freewheeling state with its windings open circuit to minimise drag.

Under such normal operating conditions the main motor 16 applies a positive torque to the screw which acts against the net load 5 during both extension and retraction of the landing gear.

If the interaction between the nut 14 and the screw 15 becomes less efficient (for instance if some of the rollers become partially jammed due to contamination or internal failure) then the amount of positive torque required to decelerate the landing gear during extension reduces, and the amount of positive torque required to accelerate the landing gear during retraction increases by an equivalent amount. This can be accommodated by the main motor 16 within limits, but if the actuator becomes severely jammed then the main motor 16 may no longer be able to generate sufficient positive torque to retract the landing gear. However this failure mode is acceptable since the inability to retract the landing gear is not safety-critical.

When the actuator becomes jammed to the extent that frictional forces are greater than the net load 5 (a failure mode which will be referred to below as "partially jammed") then the main motor 16 is reversed by the normal system 30 to push the landing gear down into its extended position. Under such operating conditions the negative torque applied by the main motor 16 acts in the same sense as the net load 5.

In certain circumstances the landing gear may fail to extend after the selector lever 34 has been actuated by the pilot. Typically this will be for one of two reasons:
- failure case 1: the actuator is fully jammed and the main motor is unable to generate sufficient negative torque to overcome frictional forces within the actuator
- failure case 2: one of the "normal" components of the apparatus has failed: for example the selection lever 34, the main motor 16, the normal system 30, the normal power supply 31, or the connection between any two of these components has failed.

If the pilot is informed, via a cockpit display, that the landing gear has failed to extend after the pilot has switched the lever 34 from its up (retract) to its down (extend) position, then the pilot initiates an emergency operating procedure by operating an emergency extend selector switch 35. The emergency extension system 32 then energises the emergency electric motor 17 and sends a power isolation signal 36 to the normal system 30 which de-energises the main motor 16.

If the actuator 4 is not jammed during such emergency operating conditions, then the emergency motor 17 is controlled in a similar manner to the main motor during normal operating conditions. That is, the emergency main motor 17 applies a positive torque in opposition to the net load 5 as the landing gear extends. If, however, the actuator 4 is partially jammed under such emergency operating conditions, then the emergency main motor 17 applies a negative torque (in the same sense as the net load 5) to drive it down to its extended position.

Surprisingly, it has been found that there is a very low probability that the nut/screw interface will become fully jammed (failure case 1 above) to the extent that the landing gear cannot be extended by either the direct-drive emergency motor 17 or the direct-drive main motor 16. This enables the actuator 4 to be very light and compact, comprising only a single nut/screw interface and a pair of direct-drive motors.

According to screw friction analysis the motor torque required to react the net load 5 depends on the helix angle and friction. For a given screw geometry, for any value of friction, the magnitude of torque required to retract the landing gear (in opposition to the net load) is greater than that required to extend the landing gear (in the same direction as the net load). Therefore the emergency motor 17 need only be sized, in terms of its torque capability, to be at least that of the main motor 16.

If retraction fails (via the main motor 16) due to increased screw friction, then the emergency motor 17 will have sufficient torque capability to extend the landing gear. In such circumstances the pilot will first attempt to extend the landing gear using the normal system, and if this fails will switch to the emergency system.

The speed of operation of the emergency extension system is not critical, therefore the emergency motor 17 will be designed to generate the required torque, but run much more slowly, so that it can be powered from a 28 VDC emergency power supply.

Under emergency operating conditions the main motor 16 is driven in a freewheeling state by the rotating screw. Under these conditions the main motor 16 may have its windings open circuit to minimise drag, or it may have its windings short circuited if drag is desirable during extension to oppose the net load 5.

FIG. 5 shows an alternative actuator, with equivalent components being given the same reference numbers. In this case the main motor 16 is replaced with a fault tolerant main motor. The main motor has a first winding (not shown) which can be energised by a first power supply 40, and a second independent winding (also not shown) which can be energised by a second power supply 41. This provides a further element of redundancy to the system.

Although the invention has been described above with reference to one or more preferred embodiments, it will be appreciated that various changes or modifications may be made without departing from the scope of the invention as defined in the appended claims.

The invention claimed is:

1. Apparatus for use on an aircraft, the apparatus comprising:
   a component;
   an actuator arranged to move the component between a first position and a second position, net load from external forces acting on the component tending to drive it towards the first position, wherein the actuator comprises:
   a threaded screw;
   a threaded nut;
   a main prime mover coupled to said screw or said nut in order to impart relative linear motion between the screw and the nut;
   an emergency prime mover coupled to said screw or said nut in order to impart relative linear motion between the screw and the nut;
   a normal control system configured to energise the main prime mover under normal operating conditions so that it applies torque to the screw or nut acting in opposition to the net load; and
   an emergency control system configured to energise the emergency prime mover under emergency operating conditions so that it applies torque to the screw or nut acting in the same sense as the net load thereby driving the component to the first position,
   wherein the emergency control system is configured so that under the normal operating conditions the emergency prime mover is not energized by the emergency control system to apply torque to the screw or nut.

2. The apparatus of claim 1 wherein at least one of the main prime mover and the emergency prime mover is coupled to the screw or the nut without any reduction mechanism.

3. The apparatus of claim 1 wherein the at least one of main prime mover and the emergency prime mover can be driven by the nut or screw.

4. The apparatus of claim 1 further comprising a set of rolling elements between the nut and the screw.

5. The apparatus of claim 4 wherein the rolling elements are elongate rollers.

6. The apparatus of claim 1 wherein the main prime mover is coupled to the screw.

7. The apparatus of claim 6 wherein the emergency prime mover is coupled to the screw.

8. A landing gear comprising a landing gear leg and the apparatus of claim 1, wherein the component is a landing gear component, and the actuator is arranged to move the landing gear leg between an extended position and a retracted position, net load from external forces acting on the landing gear leg tending to drive it towards the extended position.

9. The apparatus of claim 1 wherein the emergency prime mover is further configured to apply torque to the screw or nut acting in the opposite sense to the net load under alternative emergency operating conditions in which the main prime mover has failed but the component can be moved from the second position to the first position by operation of the net load alone.

10. The system of claim 1 wherein the normal control system comprises a normal power supply; and the emergency control system comprises an emergency power supply which can be operated independently of the normal power supply.

11. The system of claim 1 wherein the emergency control system is configured to send a power isolation signal to the normal control system which causes the normal control system to de-energise the main motor so that the main motor is driven by the nut or screw.

12. A method of operating an apparatus for use on an aircraft, wherein the apparatus comprises
   a component; an actuator arranged to move the component between a first position and a second position, net load from external forces acting on the component tending to drive it towards the first position, wherein the actuator comprises a threaded screw;
   a threaded nut; a main prime mover arranged to rotate the screw or the nut in order to impart relative linear motion between the screw and the nut;
   an emergency prime mover arranged to rotate the screw or the nut in order to impart relative linear motion between the screw and the nut;
   a normal control system configured to energize the main prime mover under normal operating conditions so that the main power mover applies torque to the screw or nut acting in opposition to the net load; and
   an emergency control system configured to energize the emergency prime mover under emergency operating conditions so that the emergency power mover applies torque to the screw or nut acting in the same sense as the net load thereby driving the component to the first position, wherein the emergency control system is configured so that under the normal operating conditions the emergency prime mover is not energized by the emergency control system to apply torque to the screw or nut, the method comprising:

applying a first torque to the nut or screw with the main prime mover when the component moves from the second position to the first position under normal operating conditions;

applying a second torque to the nut or screw with the main prime mover when the component moves from the first position to the second position under normal operating conditions; and applying a third torque to the nut or screw with the emergency prime mover to drive the component from the second position to the first position under emergency operating conditions in which the interface between the nut and the screw has become partially jammed.

13. The method of claim 12 wherein the emergency prime mover is driven by the nut or screw when the main prime mover is applying torque to the nut or screw under normal operating conditions.

14. The method of claim 12 wherein the main motor is de-energized under the emergency operating conditions so that the main motor applies substantially no torque to the nut or screw.

15. The method of claim 12 further comprising applying a torque to the nut or screw with the emergency prime mover under alternative emergency operating conditions in which the main prime mover has failed but the component can be moved to the first position.

* * * * *